(12) United States Patent
Molinari

(10) Patent No.: US 9,272,188 B2
(45) Date of Patent: Mar. 1, 2016

(54) MULTI-LAYER GOLF BALL WITH BLADDER CORE

(75) Inventor: Arthur P. Molinari, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 892 days.

(21) Appl. No.: 13/408,209

(22) Filed: Feb. 29, 2012

(65) Prior Publication Data
US 2013/0225323 A1    Aug. 29, 2013

(51) Int. Cl.
| | |
|---|---|
| A63B 37/06 | (2006.01) |
| A63B 37/00 | (2006.01) |
| A63B 45/00 | (2006.01) |
| B29C 49/00 | (2006.01) |
| A63B 41/02 | (2006.01) |
| A63B 41/04 | (2006.01) |
| B29L 31/54 | (2006.01) |
| B29C 49/22 | (2006.01) |

(52) U.S. Cl.
CPC ......... *A63B 37/0045* (2013.01); *A63B 37/0003* (2013.01); *A63B 37/0052* (2013.01); *A63B 37/0056* (2013.01); *A63B 45/00* (2013.01); *B29C 49/0047* (2013.01); *A63B 37/0076* (2013.01); *A63B 41/02* (2013.01); *A63B 41/04* (2013.01); *B29C 49/22* (2013.01); *B29C 2049/0057* (2013.01); *B29L 2031/546* (2013.01)

(58) Field of Classification Search
CPC .................................................. A63B 37/0052
USPC ........................................................ 473/354
See application file for complete search history.

(56) References Cited

U.S. PATENT DOCUMENTS

| | | | |
|---|---|---|---|
| 5,919,100 A * | 7/1999 | Boehm et al. ................. | 473/354 |
| 5,952,065 A | 9/1999 | Mitchell et al. | |
| 5,980,395 A | 11/1999 | Tsunoda et al. | |
| 6,106,414 A | 8/2000 | Yeh | |
| 6,117,024 A | 9/2000 | Dewanjee | |
| 6,126,560 A | 10/2000 | Maruoka et al. | |
| 6,162,134 A | 12/2000 | Sullivan et al. | |
| 6,162,135 A | 12/2000 | Bulpett et al. | |
| 6,193,619 B1 | 2/2001 | Wu et al. | |
| 6,196,937 B1 | 3/2001 | Kuttappa | |
| 6,203,451 B1 * | 3/2001 | Rajagopalan ................. | 473/371 |
| 6,231,460 B1 | 5/2001 | Higuchi et al. | |
| 6,251,030 B1 | 6/2001 | Kato et al. | |
| 6,277,920 B1 | 8/2001 | Nesbitt | |
| 6,294,617 B1 | 9/2001 | Rajagopalan | |
| 6,309,312 B1 | 10/2001 | Sullivan et al. | |
| 6,315,683 B1 | 11/2001 | Yoshida et al. | |
| 6,319,155 B1 | 11/2001 | Moriyama et al. | |
| 6,386,993 B1 | 5/2002 | Yokota | |
| 6,406,383 B2 | 6/2002 | Moriyama et al. | |
| 6,475,103 B1 | 11/2002 | Kato | |
| 6,561,927 B1 | 5/2003 | Sullivan et al. | |
| 6,572,492 B2 | 6/2003 | Tinsman | |
| 6,589,124 B1 | 7/2003 | Maruoka et al. | |

(Continued)

*Primary Examiner* — Raeann Gorden
(74) *Attorney, Agent, or Firm* — Honigman Miller Schwartz & Cohn LLP

(57) ABSTRACT

The present disclosure is directed to a golf ball and a method for manufacturing a golf ball including a bladder core. In at least one embodiment, the bladder core includes an ethyl vinyl alcohol copolymer layer combined with multiple layers of thermoplastic polyurethane or other material to prevent leakage. In addition, it is contemplated that the bladder core may include a one-way valve for adjusting the pressure of a fluid within the bladder core to produce different performance characteristics.

12 Claims, 14 Drawing Sheets

(56) References Cited

U.S. PATENT DOCUMENTS

| | | |
|---|---|---|
| 6,705,957 B2 | 3/2004 | Owens et al. |
| 6,755,753 B2 | 6/2004 | Nesbitt et al. |
| 6,774,187 B2 | 8/2004 | Voorheis et al. |
| 6,838,036 B2 | 1/2005 | Sugimoto |
| 6,905,647 B2 | 6/2005 | Endo et al. |
| 6,964,622 B1 | 11/2005 | Dewanjee |
| 7,041,007 B2 | 5/2006 | Boehm et al. |
| 2009/0325745 A1 | 12/2009 | Rapaport et al. |
| 2012/0108361 A1 | 5/2012 | Oldknow |
| 2012/0283055 A1 | 11/2012 | Berggren et al. |
| 2012/0283056 A1 | 11/2012 | Berggren et al. |

* cited by examiner

MULTI-LAYER GOLF BALL WITH BLADDER CORE

BACKGROUND

The present disclosure relates generally to a multi-layer golf ball having a bladder core.

Golf is a sport that enjoys wide popularity around the world and is played by golfers of all ages, from young to old. To aid and improve their performance, golfers continually search for and adopt the best and newest equipment, including golf clubs, golf balls, apparel and training devices. To that end, there are many equipment choices available, including a number of different golf balls brands and types, each designed to exhibit certain characteristics in play.

Golf balls constructions have generally included a core made from a resilient material and a cover made from a more durable material, such as synthetic resin. The core is typically made from rubber or a similar material and typically has a wound or solid construction. Intermediate layers made from a variety of materials may be provided between the core and cover to vary the perceived feel when the ball is hit, or to exhibit certain performance characteristics in play. Typically, golfers use balls with constructions that achieve their desired feel and performance.

The present disclosure is directed to a golf ball and a method for manufacturing a golf ball including a bladder core.

SUMMARY

The disclosure provides a golf ball with a bladder forming the inner core. The bladder includes walls made of thin sheets of polymeric materials, where the walls define an interior space. The interior space of the bladder is, in some embodiments, filled with a fluid, such as a pressurized gas or a liquid. The materials used to form the thin sheets are selected so as to inhibit the bleeding of the fluid through the walls of the bladder. In one aspect, where the gas is air or nitrogen, for example, the material may include ethylene-vinyl alcohol copolymer. The ethylene-vinyl alcohol copolymer may be used in conjunction with sheets of thermoplastic polyurethane (TPU), so that the walls of the bladder are durable, flexible, readily manufactured, and cost-effective.

In one aspect, the disclosure provides a golf ball having a core, an intermediate layer substantially surrounding the core, and an outer layer substantially surrounding the intermediate layer, wherein the outer layer includes a plurality of dimples. According to aspects described herein, the core of the golf ball comprises a bladder formed from an ethyl vinyl alcohol copolymer layer and contains a pressurized fluid.

In another aspect, the disclosure provides a golf ball having a core, an intermediate layer substantially surrounding the core, and an outer layer substantially surrounding the intermediate layer, wherein the outer layer includes a plurality of dimples. According to aspects described herein, the core of the golf ball comprises a bladder, the bladder formed from a plurality of bladder panels joined together to form a sealed structure that encloses a pressurized fluid.

In yet another aspect, the disclosure provides a method of manufacturing a golf ball the steps of: placing a plurality of flattened polymer elements in a restriction structure; bonding the plurality of flattened polymer elements together to define seams in a bladder; inflating the bladder to take on the shape of the restriction structure; injecting a pressurized fluid into the bladder and sealing the bladder; molding a rubber composition around the bladder to form an intermediate layer; and applying a cover layer.

Other systems, methods, features and advantages of the present disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles disclosed herein. Moreover, in the figures, like reference numerals designate corresponding parts throughout the different views.

DETAILED DESCRIPTION

Figure 1:
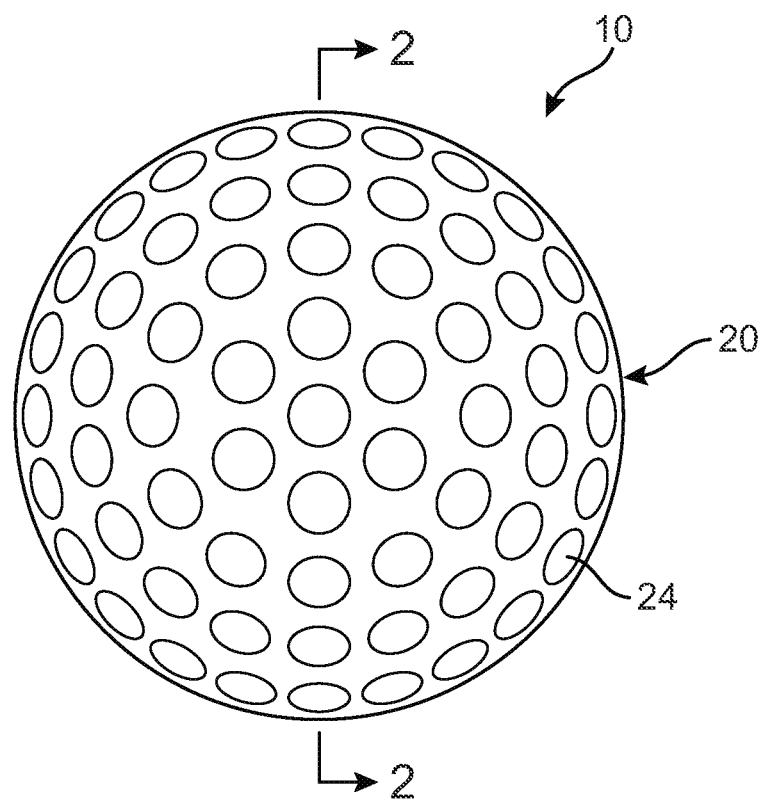
FIG. 1 is a perspective view of a golf ball having a bladder according to one or more embodiments set forth herein.

The present disclosure relates to a golf ball incorporating a bladder core, as well as a method for manufacturing a bladder core for a golf ball.

The disclosure provides a golf ball with a bladder forming the inner core. The bladder includes walls made of thin sheets of polymeric materials, where the walls define an interior space. The interior space of the bladder is, in some embodiments, filled with a fluid, such as a pressurized gas or a liquid. The materials used to form the thin sheets are selected so as to inhibit the bleeding of the fluid through the walls of the bladder. In one aspect, where the gas is air or nitrogen, for example; the material may include ethylene-vinyl alcohol copolymer. The ethylene-vinyl alcohol copolymer may be used in conjunction with sheets of thermoplastic polyurethane (TPU), so that the walls of the bladder are durable, flexible, readily manufactured, and cost-effective.

The performance of a golf ball may be driven by a number of factors including, but not limited to, the materials that are used to make the ball, the number of layers within the ball, the hardness and/or density of the material that makes up each layer, the thickness of each layer, and the way the layers are put together to form the ball. Each of these features may affect the perceived feel of the ball when it is struck by the dub face as well as the performance of the ball in flight and on touchdown, including the velocity and resulting spin achieved by the ball in flight. For example, solid golf balls with multiple internal layers may create more spin as the ball is launched from the face of a dub. Other features of the core may create less spin on the ball causing increased velocity and distance when the ball is hit. Golfers typically select balls based on the desired play characteristics of the ball and the fed of the ball, often based upon the golfer's skill level and personal preferences.

According to embodiments set forth herein, a golf ball may include a provision to lighten the core layer of the ball. As those skilled in the art will readily appreciate, a golf ball containing a core that is light relative to the other layers in the ball presents a number of benefits. One benefit known in the art is that a lighter core shifts the moment of inertia (MOI) of the ball to the perimeter of the ball. In shifting the MOI to the perimeter, the spin rate off the club head upon impact is also reduced, allowing the ball to travel farther.

Another well-known result of a lighter core ball is a lower compression rate. As is known in the art, the compression rate of a ball is the expression (i.e., a number typically in the range of 0 to 200) of how much deflection a ball undergoes when it is subjected to a compressive load, such as a golf dub. In other words, as a golf ball is hit, the spherical shape will become more hemispherical. The higher the compression rate of the ball, the less compression the ball will display when hit. When a ball has a soft and/or lighter core, the ball tends to be more easily compressed, allowing golfers with a slower clubhead speed to take advantage of the spring effect that results from compression of the ball, and, thereby to achieve more total distance from a shot.

Yet another benefit of a golf ball with a lighter core results from a combination of the shift in the MOI to the perimeter with the lower compression rate. In particular, the shift in the MOI (and the resulting reduction in spin rate) allows a golfer with a high club head speed to maintain performance, while the lower compression rate of the ball allows for enhanced performance from a golfer with a lower club head speed.

FIG. 1 depicts a golf ball 10, according to at least one embodiment described herein. According to FIG. 1, golf ball 10 includes a cover layer 20. Cover layer 20 may be covered in its entirety with a plurality of dimples 24 to create an overall dimpled pattern, as is known in the art. Most golf balls in play today may look and feel very similar to golf ball 10 with exterior variations in color, markings on the ball, the dimple pattern, and the hardness of the cover layer. Internally, however, golf balls may exhibit a variety of features including multiple layers made from a variety of materials.

Figure 2:
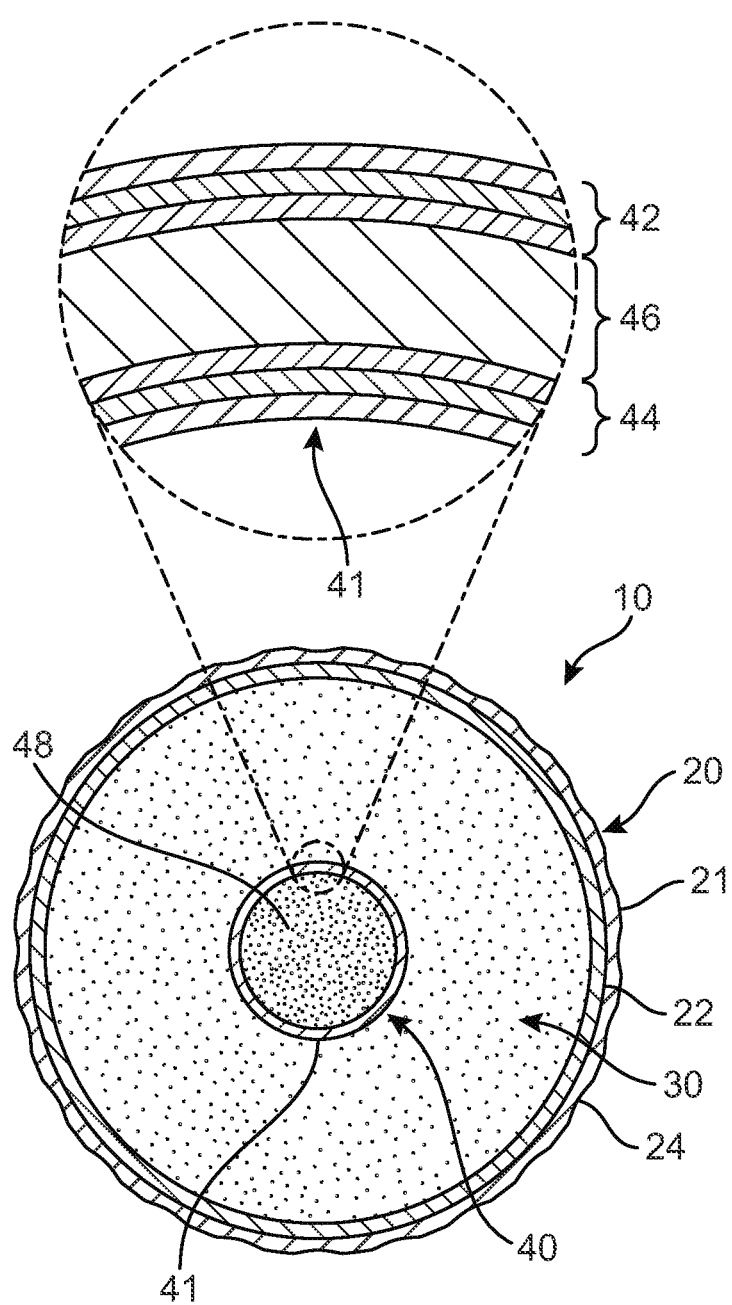
FIG. 2 is a cross-sectional view of the golf ball depicted in FIG. 1, as defined by section line 2 in FIG. 1, according to an embodiment set forth herein.

As depicted in the cross-sectional view of golf ball 10 in FIG. 2, an embodiment of golf ball 10 exhibits a layered structure having (a) a cover layer 20 that forms an exterior portion of golf ball 10, (b) an intermediate layer 30 located within cover layer 20, where cover layer 20 substantially surrounds intermediate layer 30, and (c) an internal core 40 that forms an interior portion of ball 10, where intermediate layer 30 substantially surrounds internal core 40. As discussed in more detail below, golf ball 10 may be varied to include additional layers of varying materials and varying hardnesses to achieve a desired play characteristic, such as a specific "feel" when the ball is hit or a specific spin or velocity characteristic in flight.

As used herein, the term "cover layer" may be understood as the outermost structural layers of a golf ball, not including any relatively thin finishing or coating layers. In the embodiment depicted in FIG. 2, cover layer 20 may include an outer cover 21 and inner cover layer 22. The outer cover 21 of cover layer 20 includes at least one dimple 24, and typically, a plurality of dimples 24, which affect the aerodynamic performance of golf ball 10. Inner cover layer 22 may or may not be present.

Cover layer 20 may be made from a variety of materials known in the art. Outer cover 21 may be constructed from a variety of materials ranging from harder to softer, depending on the specific performance characteristics desired. For example, softer covers are generally associated with greater control, as golf ball 10 may be easier to spin with a soft cover, which harder covers are generally associated with durability. Inner cover layer 22 may be formed from a harder material than outer cover 21, thus adding protection to golf ball 10 facilitating its durabiltity. Inner cover 22 may also be a harder material than outer cover 21 so that spin and control are maximized on iron shots, which experience softer outer cover 21, while also maximizing distance on driver shots, which experience harder inner cover 22. Cover layers with different hardnesses may also improve the feel of golf ball 10. Materials used for the outer cover 21 and inner cover layer 22 of cover layer 20 may include any known golf ball cover materials, such as, synthetic resins, rubber compositions, and other polymers in a variety of hardness levels.

In the embodiment depicted in FIG. 2, intermediate layer 30 covers and substantially encloses internal core 40. Intermediate layer 30 may have any thickness. While the thickness of intermediate layer 30 will generally be dictated by the thickness of internal core 40 and the existence of additional layers within the golf ball, in one embodiment, the thickness of intermediate layer may range from about 3 millimeters to about 11 millimeters. In some embodiments, the thickness of intermediate layer 30 may be selected to ensure that golf ball 10 is a conforming golf ball, i.e., conforms to the USGA Rules of Golf. Intermediate layer 30 may be made from a variety of polymer and/or thermoset materials known in the art. In some embodiments, the thermoset material may be a rubber composition using any rubber composition known in the art.

According to at least one embodiment, internal core 40 is the innermost portion of golf ball 10 and may comprise a bladder 41 filled with a core substance 48, such as pressurized fluid. In other embodiments, core substance 48 could comprise a liquid or a gel. Similar to inflatable sport balls, such as a soccer ball or a volley ball, internal core 40 may be formed from multiple malleable panels capable of being thermoformed and inflated during manufacturing. Such technology has previously been described in relation to inflatable sport balls in U.S. Patent Application Publication Number 2009/0325745, filed on Jun. 27, 2008, U.S. patent application Ser. No. 13/101,026, filed on May 4, 2011, and U.S. patent application Ser. No. 13/101,041, filed on May 4, 2011, each of which is herein incorporated by reference in its entirety.

As described in greater detail below, the walls of bladder 41 may be constructed from multiple panels (e.g., first panel 61 and second panel 62 in FIG. 5A) bonded together to form seams. Further, each of first panel 61 and second panel 62 may be formed from a wide range of polymer materials, selected in part on a material's resistance to the bleeding of air molecules through the material. One such suitable material is thermoplastic polyurethane. In addition to thermoplastic polyurethane, examples of polymer materials that may be suitable for the walls of bladder 41 include urethane, polyester, polyester polyurethane, and polyether polyurethane. The walls of bladder 41 may also be formed from a material that includes alternating layers of thermoplastic polyurethane and ethylene-vinyl alcohol copolymer. In some embodiments, the walls of bladder 41 may be formed from multiple layers fused together wherein a center layer is formed of ethylene-vinyl alcohol copolymer (EVOH), layers adjacent to the center layer are formed of thermoplastic polyurethane (TPU).

In at least one embodiment, the walls of bladder 41 may be comprised of seven layers fused together, as is depicted in the inset portion of FIG. 2. In particular, bladder 41 may comprise one EVOH layer 46 in the center with multiple layers of TPU, upper TPU layers 42 and lower TPU layers 44. EVOH layer 46 serves to prevent the molecules of gas enclosed within from escaping. According to aspects described herein, each of EVOH layer 46, upper TPU layers 42 and lower TPU layers 44 may comprise a thin film such that the film thickness is in the range of about 5-10 microns. In some embodiments, an additional EVA/Surlyn® film may be applied over upper TPU layers 42 to improve adhesion between bladder 41 and any adjacent layers, such as intermediate layer 30.

The number and order of the layers of EVOH and TPU of bladder 41 may be altered as would be contemplated by a skilled artisan. Furthermore, it should be understood that any of the multiple upper TPU layers 42 and lower TPU layers 44 in the depicted embodiment may be achieved by an alternate thermoplastic polymer that is capable of being turned into a film.

Bladder 41 may enclose a core substance 48, such as a fluid. If the fluid is a gas, the gas may be pressurized between zero and three-hundred-fifty kilopascals (i.e., approximately fifty-one pounds per square inch) or more. In addition to air and nitrogen, the fluid contained by bladder 41 may include octafluorapropane or be any of the gasses disclosed in U.S. Pat. No. 4,340,626 to Rudy, such as hexafluoroethane and sulfur hexafluoride, for example. Although discussed above as having a sealed and valve-less configuration, some configurations of bladder 41 may incorporate a valve that permits adjustments to the pressure of the fluid, such as the embodiment depicted in FIGS. 8-12 and described in more detail below.

A variety of manufacturing processes may be utilized for the bladder 40 depicted in FIG. 2. As an example, a thermoforming process may form bladder 41 from a pair of polymer sheets that are molded to form first bladder panel 61 and second bladder panel 62 (shown in FIGS. 5A-5C) and bonded to seal bladder 41 and define seam 64 (shown in FIG. 5C). More particularly, the thermoforming process (a) imparts shape to one of the polymer sheets in order to form a hemispherical or otherwise curved structure of one of first bladder panel 61 and second bladder panel 62, (b) imparts shape to another of the polymer sheets in order to form a hemispherical or otherwise curved structure of the other of first bladder panel 61 or second bladder panel 62, and (c) forms seam 64 by bonding peripheries of the curved structures formed from the polymer sheets. The thermoforming process may also involve sealing bladder 40 or incorporating an inflation tube 63 (shown in FIG. 5B) that permits bladder 41 to be pressurized.

Figure 3:
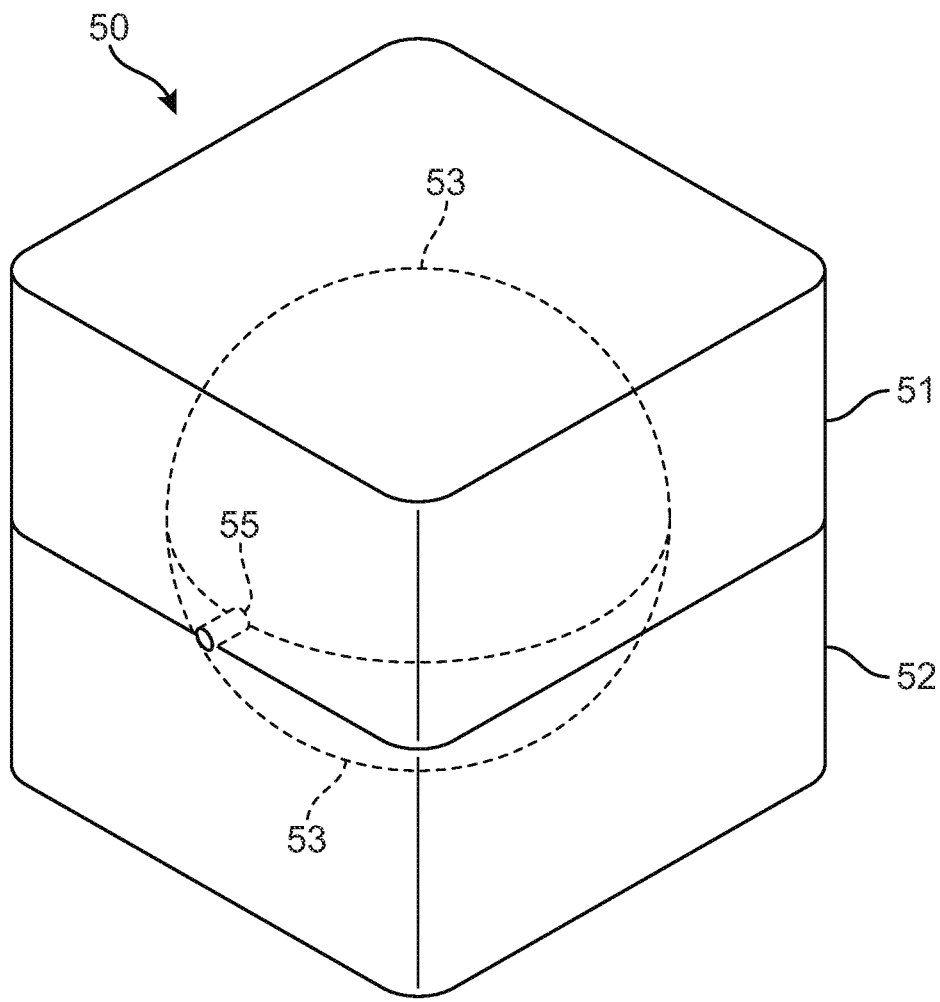
FIG. 3 is a perspective view of a mold for forming a bladder according to an embodiment set forth herein.
Figure 4:
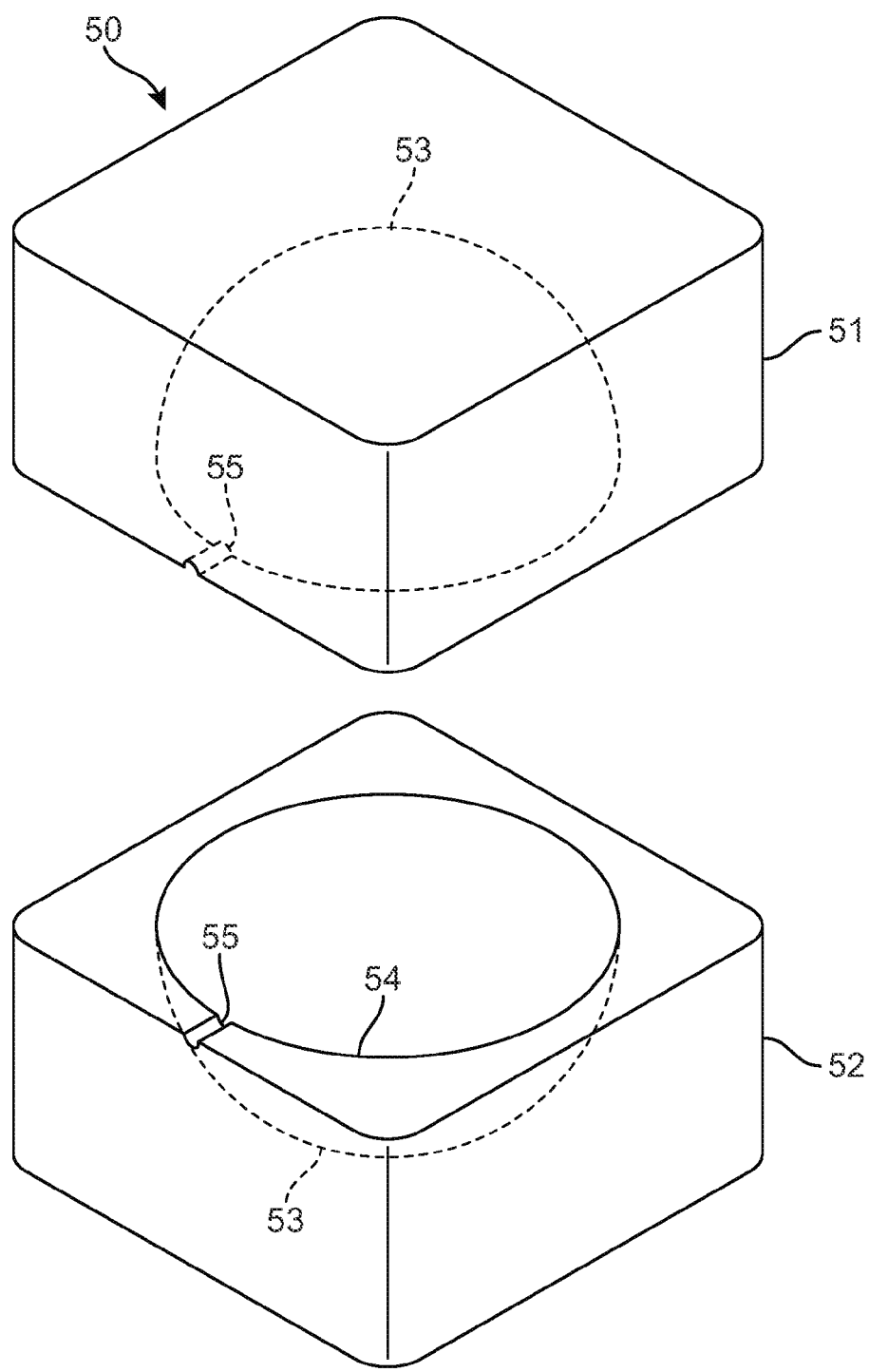
FIG. 4 is an exploded perspective view of the mold according to an embodiment set forth herein.

FIGS. 3 and 4 depict an exemplary mold 50 that may be used for the thermoforming process described above, according to at least one embodiment. In particular, mold 50 having an upper mold portion 51 and a lower mold portion 52 may be formed to define an internal cavity 53 with the configuration of bladder 41, so that the inner surface of upper mold portion 51 and lower mold portion 52 are mold surfaces or restriction surfaces against which the polymer material of the walls of bladder 41 are to be pressed to be shaped during the molding process. When upper mold portion 51 and lower mold portion 52 are joined together, therefore, internal cavity 53 has a generally spherical shape with the approximate dimensions of bladder 41. Depending upon the degree to which the pressurization of bladder 41 induces the polymer material to stretch, internal cavity 53 may exhibit lesser volume or a lesser diameter than bladder 41 in the pressurized state.

Figure 5A:
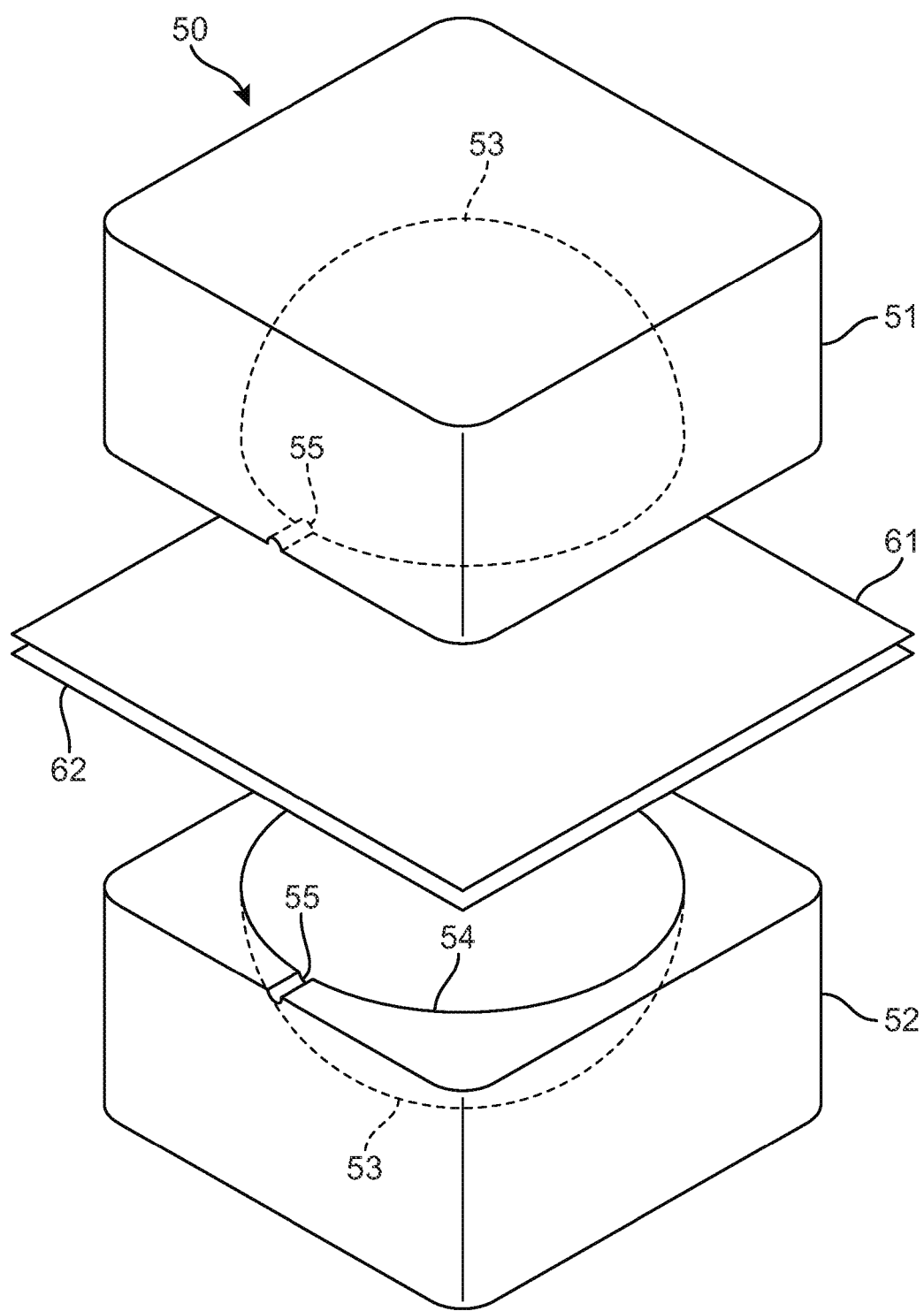
FIGS. 5A-5C are schematic perspective views of a manufacturing process for forming a bladder according to an embodiment set forth herein.

According to aspects set forth herein, mold 50 may be utilized to form bladder 41 from a pair of polymer sheets, first bladder panel 61 and second bladder panel 62. Initially, various conductive or radiative heaters may be utilized to heat first bladder panel 61 and second bladder panel 62. At elevated temperatures that depend upon the specific polymer material utilized, first bladder panel 61 and second bladder panel 62 soften or become more deformable, which facilitates shaping and bonding. Once heated, first bladder panel 61 and second bladder panel 62 are positioned between upper mold portion 51 and lower mold portion 52, as depicted in FIG. 5A. In some manufacturing processes, a plurality of conduits may extend through mold 50 in order to channel a heated liquid, such as water or oil, through mold 50, thereby raising the overall temperature of mold 50. When first bladder panel 61 and second bladder panel 62 are positioned within mold 50, heat may be transferred from mold 50 to first bladder panel 61 and second bladder panel 62 in order to further raise the temperature of first bladder panel 61 and second bladder panel 62. The temperature of mold 50 may vary depending upon the specific materials utilized for first bladder panel 61 and second bladder panel 62.

Figure 7:
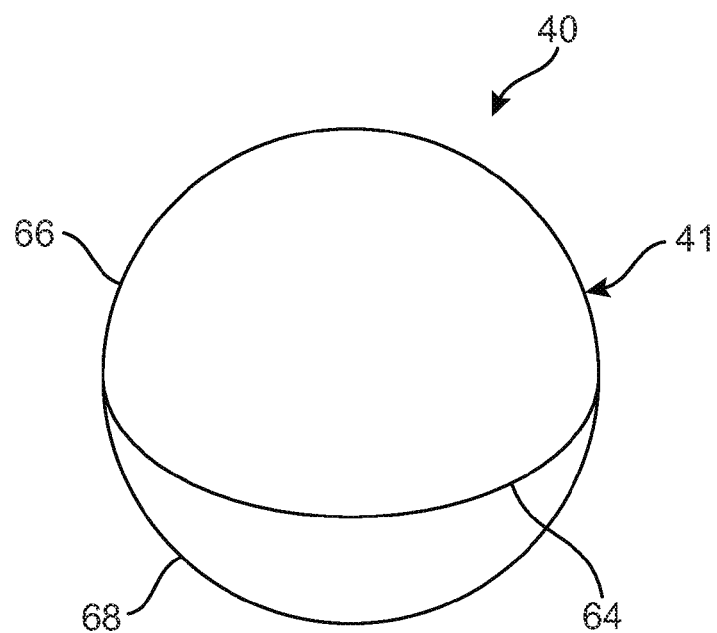
FIG. 7 is a perspective view of the bladder following the manufacturing process according to an embodiment set forth herein.

When formed into bladder 41 as depicted in FIG. 7, first bladder panel 61 and second bladder panel 62 form bladder top hemisphere 66 and bladder bottom hemisphere 68, respectively. In addition, first bladder panel 61 and second bladder panel 62 each form portions of seam 64. The thickness of first bladder panel 61 and second bladder panel 62 prior to molding may be greater than the thickness of the polymer material forming bladder 41, as seen in the inset of FIG. 2. The rationale for the difference in thickness between first bladder panel 61, second bladder panel 62 and bladder 41 is that first bladder panel 61 and second bladder panel 62 may stretch during the thermoforming process. That is, the thickness differences compensate for thinning in first bladder panel 61 and second bladder panel 62 that occurs when first bladder panel 61 and second bladder panel 62 are stretched or otherwise deformed during the formation of bladder 41.

Figure 5B:
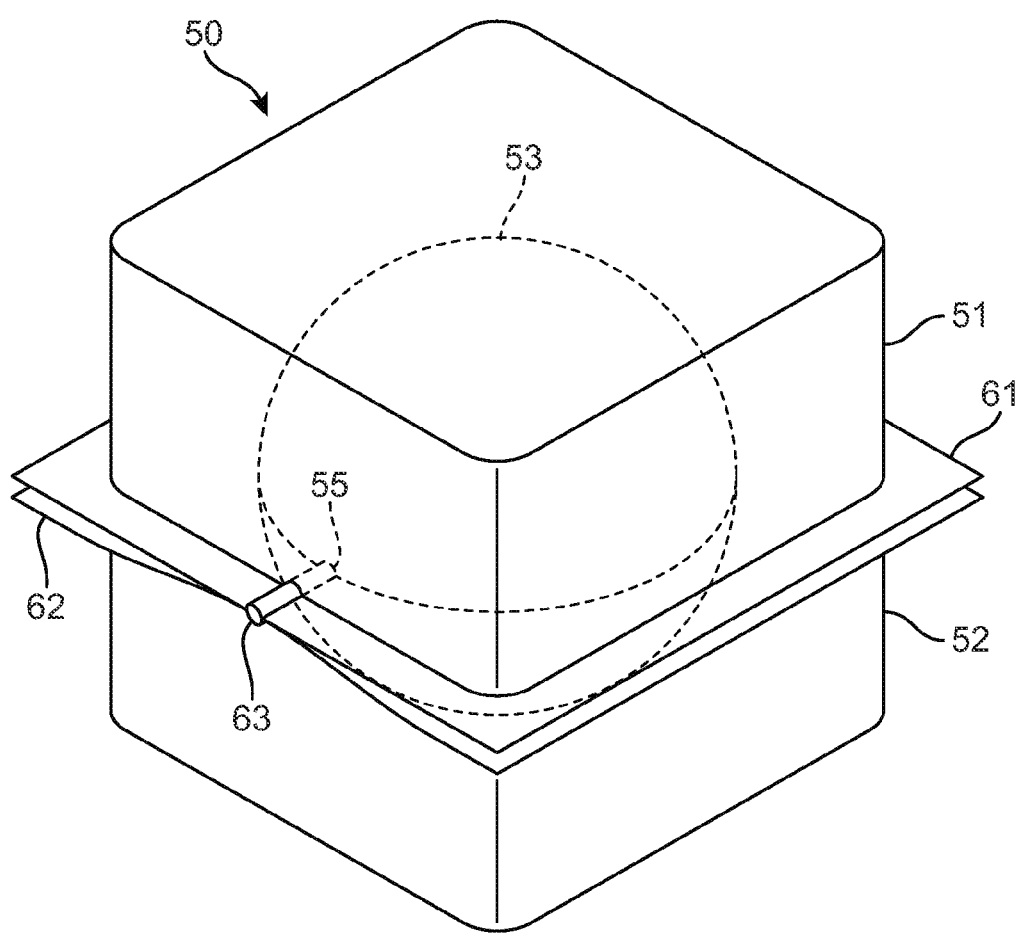

Once first bladder panel 61 and second bladder panel 62 are positioned between mold portion 51 and mold portion 52 as depicted in FIG. 5A, mold portion 51 and mold portion 52 translate toward each other such that first bladder panel 61 and second bladder panel 62 enter cavity 63 and are shaped and bonded, as depicted in FIG. 5B. As mold 50 contacts and compresses portions of first bladder panel 61 and second bladder panel 62, a fluid, such as air, having a positive pressure in comparison with ambient air may be injected between first bladder panel 61 and second bladder panel 62 to induce first bladder panel 61 and second bladder panel 62 to respectively contact and conform to the contours of mold portion 51 and mold portion 52. Air may also be removed from the area between first bladder panel 61 and second bladder panel 62 and mold portion 51 and mold portion 52 through various vents, thereby drawing first bladder panel 61 and second bladder panel 62 onto the surfaces of mold portion 51 and mold portion 52, respectively. That is, at least a partial vacuum may be formed between first bladder panel 61 and second bladder panel 62 and the surfaces of mold 50. As the area between first bladder panel 61 and second bladder panel 62 is pressurized and air is removed from the area between mold 50 and first bladder panel 61 and second bladder panel 62, first bladder panel 61 and second bladder panel 62 conform to the shape of cavity 53. More specifically, first bladder panel 61 and second bladder panel 62 stretch, bend, or otherwise conform to extend along the surfaces of cavities 53 and form the general shape of bladder 41. The final diameter of bladder 41 may be a variety of sizes and chosen to enhance performance properties. In at least one configuration, bladder 41 may have a diameter of about 24 mm and may form the inner core layer 40 of golf ball 10 as discussed above.

In addition to shaping first bladder panel 61 and second bladder panel 62, mold portion 51 and mold portion 52 compress first bladder panel 61 and second bladder panel 62 together at locations corresponding with seam 64. More particularly, a ridge 54 extending around cavity 63 may compress first bladder panel 61 and second bladder panel 62 together and form seam 64.

Figure 5C:
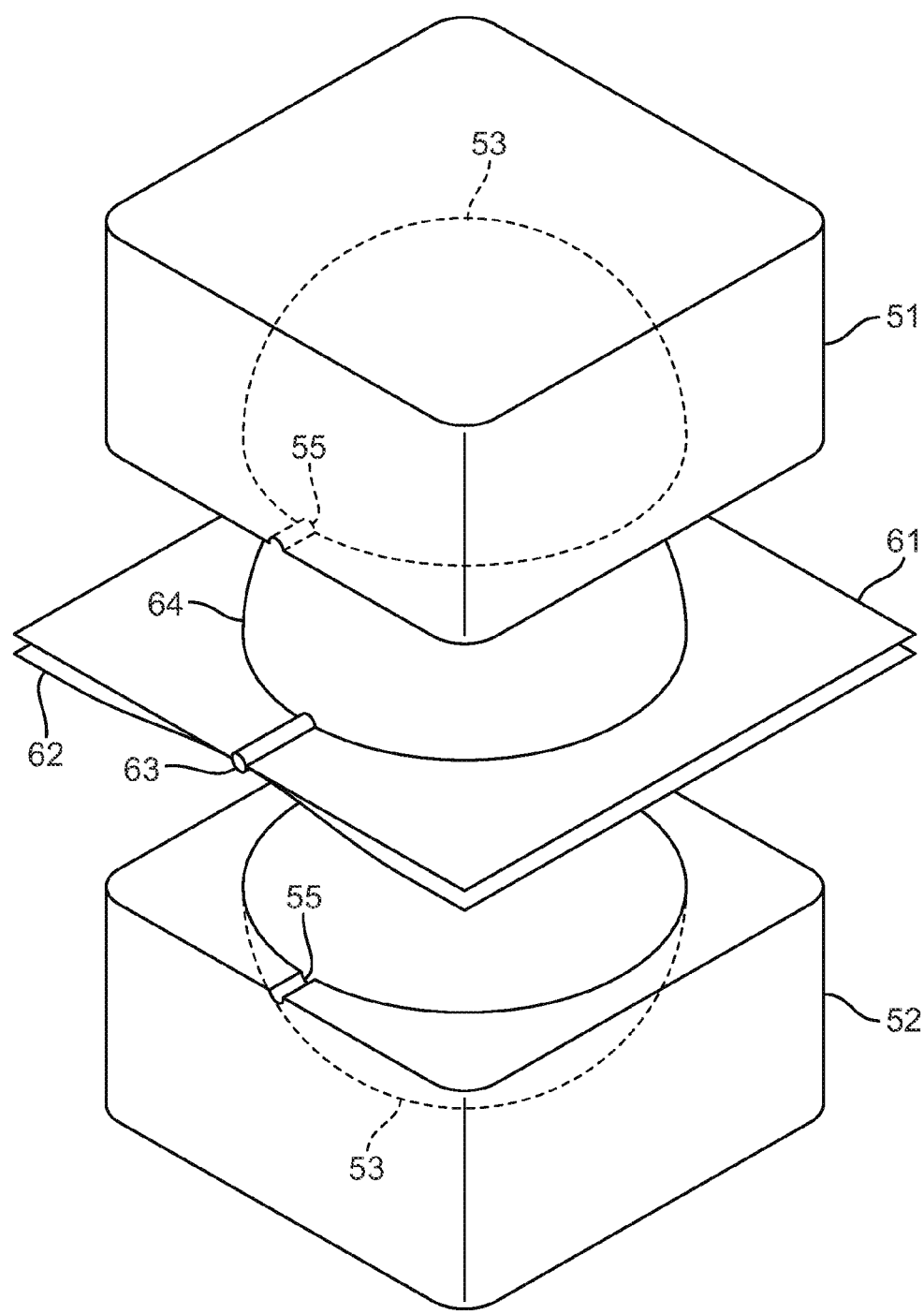
Figure 6:
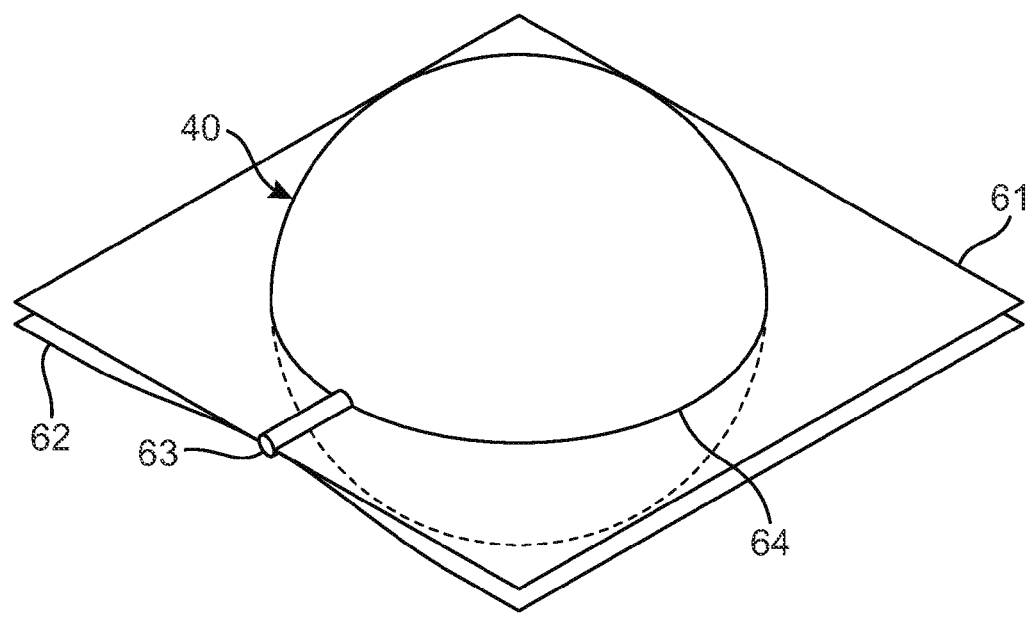
FIG. 6 is a perspective view of the bladder and residual portions of polymer sheets forming the bladder following the manufacturing process according to an embodiment set forth herein.

Once bladder 41 is formed within mold 50, mold portion 51 and mold portion 52 separate such that bladder 41 and peripheral portions of first bladder panel 61 and second bladder panel 62 may be removed from mold 50, as depicted in FIGS. 5C and 6. Bladder 41 is then permitted to cool, and a pressurized fluid may be injected into an interior of bladder 41. Referring to FIGS. 3 and 4, mold portion 51 and mold portion 52 are depicted as each including a channel 55 extending from areas forming cavity 53. During the thermoforming process discussed above, channels 55 form a conduit 63 that leads to bladder 41 at seam 64. Conduit 63 may be utilized to inject the pressurized fluid, and conduit 63 may then be sealed at a position that corresponds with seam 64 to seal bladder 41, including the core substance 48 comprising the pressurized fluid. In addition, excess portions of first bladder panel 61 and second bladder panel 62 may be trimmed or otherwise removed from bladder 41 along seam 64.

Once bladder 41 is formed to create core layer 40, intermediate layer 30 and cover layer 20 may be applied using known techniques. For example, a resin, rubber or other composition as would be known in the art may be subsequently molded around bladder 41 to form intermediate layer 30. Once intermediate layer 30 is formed, cover layer 20, including inner cover layer 22 and external cover 21, may be formed as is known in the art.

It should be understood that further manufacturing processes may be utilized to form a bladder core such as bladder 41 set forth herein, and those skilled in the art will readily recognize such further processes. Examples of alternative processes that may be used for forming bladder 41 include, but are not limited to, a blow molding process, a conventional rotational molding process, or by joining various bladder panels by heat bonding or radio frequency bonding processes. These alternative techniques are discussed in U.S. Patent Application Publication Number 2009/0325745, filed on Jun. 27, 2008, which is herein incorporated by reference in its entirety.

A golf ball with a bladder core as set forth herein may also include a one-way valve to allow for adjustment of the pressurized fluid within the core. In the past, golfers have been unable to make adjustments to a specific ball for different playing environments or to achieve certain play characteristics. For example, a golfer might want to alter a ball for play at a golf course at sea level in contrast with a golf course in the mountains; for play during colder weather in contrast with play during warmer weather; or for improving the performance of a ball for a golfer with a low golf club head speed.

Figure 8:
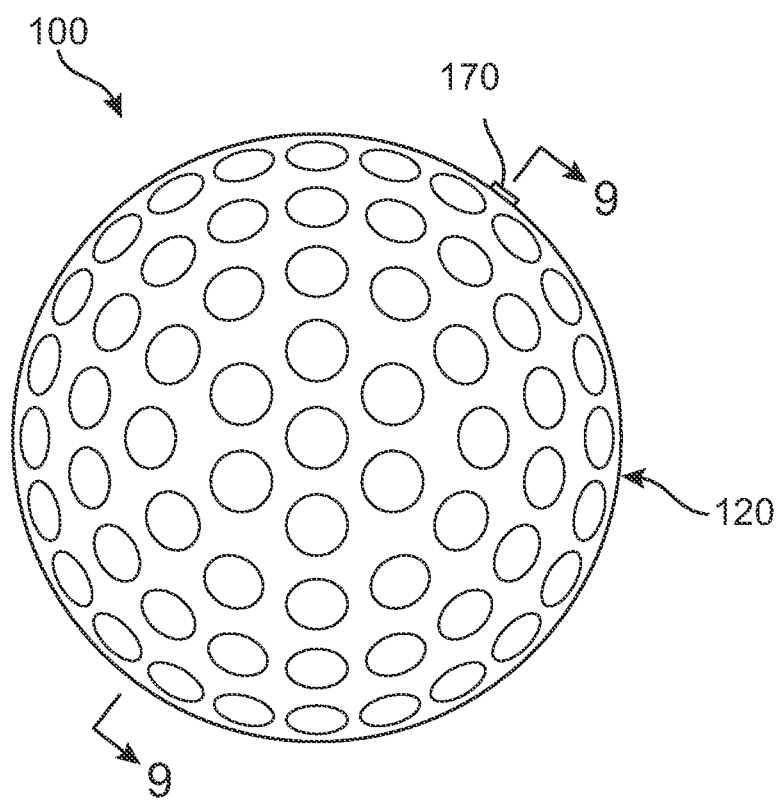
FIG. 8 is a perspective view of a golf ball having a bladder according to an additional embodiment set forth herein.
Figure 9:
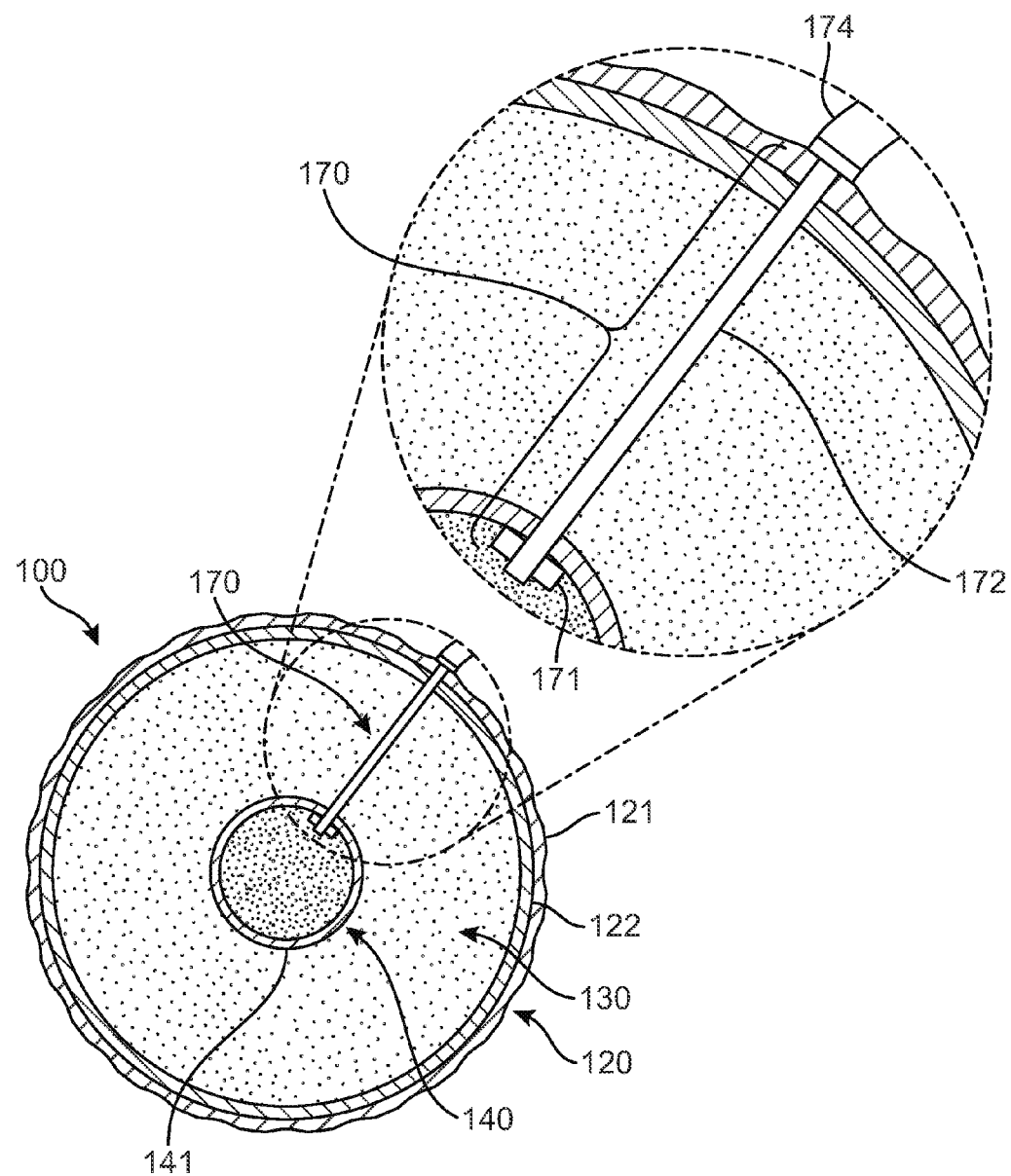
FIG. 9 is a cross-sectional view of the golf ball depicted in FIG. 8, as defined by section line 9 in FIG. 8, according to an additional embodiment set forth herein.

FIGS. 8-9 depict a golf ball 100 which includes a pin-sized one-way valve 170 for adding pressure or releasing pressure from a bladder core 140 contained within ball 100. Similar to the previously discussed embodiments, golf ball 100 may include a layered structure having (a) a cover layer 120 that forms an exterior portion of golf ball 100, (b) an intermediate layer 130 and/or mantle shell located within cover layer 120, and (c) an internal core 140. Similar to the embodiments described above, internal core 140 may be formed from a bladder 141 containing a core substance 148 that forms an interior portion of ball 100. Cover layer 120 of golf ball 100 may also include both an outer cover layer 121 and inner cover layer 122. Outer cover layer 121 of cover layer 120 includes at least one dimple 124, and typically, a plurality of dimples 124, which affect the flight characteristics of golf ball 100. Golf ball 100 may be formed from the same materials previously discussed with respect to golf ball 10. Furthermore, golf ball 100 may be altered in a variety of ways known to those of skill, such as by altering the composition of the materials used to form the ball or the number and thicknesses of the layers.

According to the embodiment depicted in FIGS. 8 and 9, golf ball 100 may further include provisions for making adjustments to the pressurized fluid or core substance 148. In at least one embodiment, golf ball 100 may include a pin-sized one-way valve 170. One-way valve 170 may be configured as is known in the art, that is, one-way valve 170 may be configured such that a pressurized substance is held within bladder 141 without escaping during normal play, yet may be adjusted using an interfacing nozzle. In particular, as shown FIG. 9, one-way valve 170 may include a nipple 171 that extends into bladder 141 and is capable of interfacing with a nozzle 172. Nozzle 172 may be attached to a hose 174 which is ultimately attached to a pump. Nipple 171 allows for a fluid to be introduced into bladder 141, or for a fluid to be withdrawn from bladder 141.

Figure 10A:
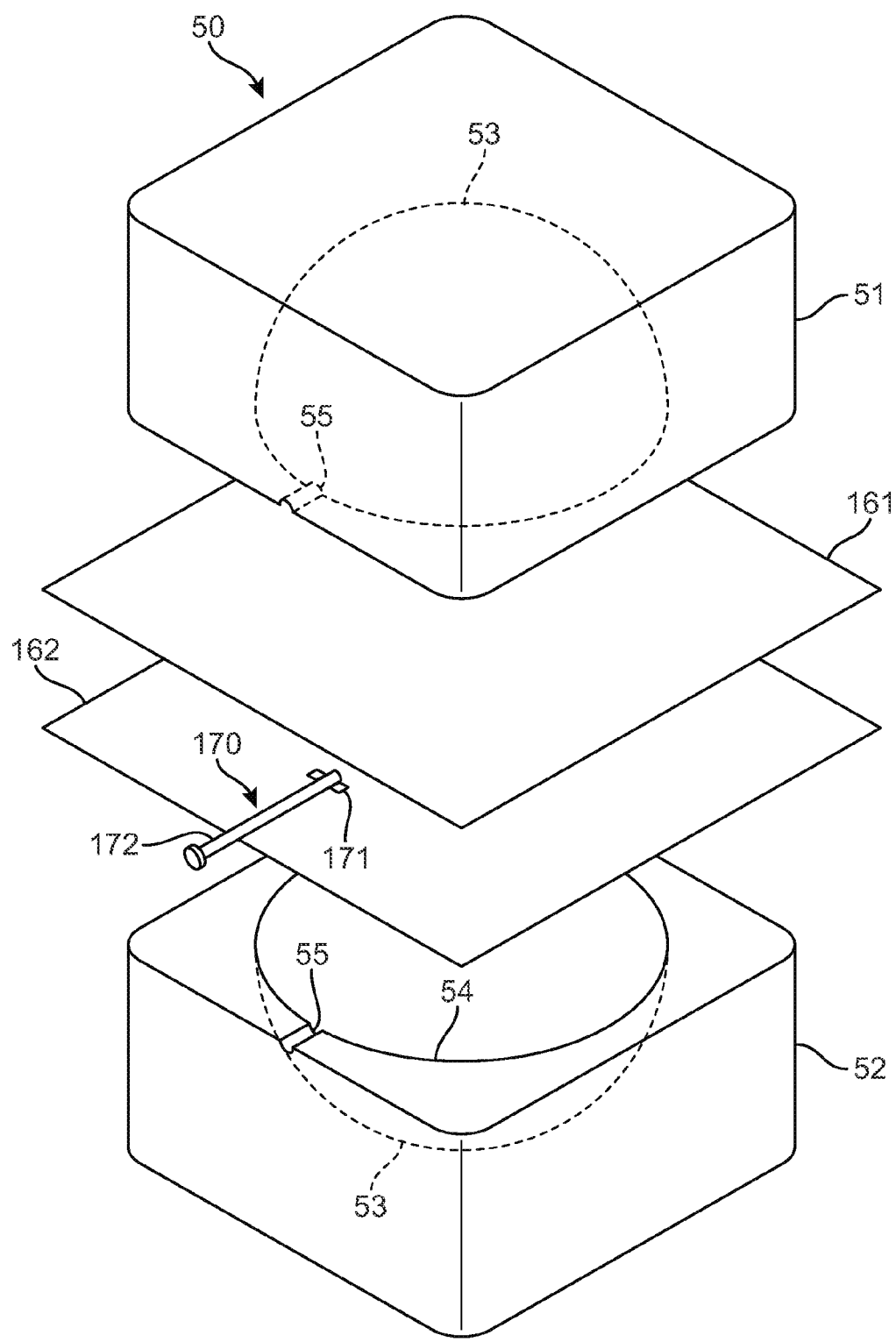
FIGS. 10A-10B are schematic perspective views of a manufacturing process for forming a bladder according to an additional embodiment set forth herein.
Figure 10B:
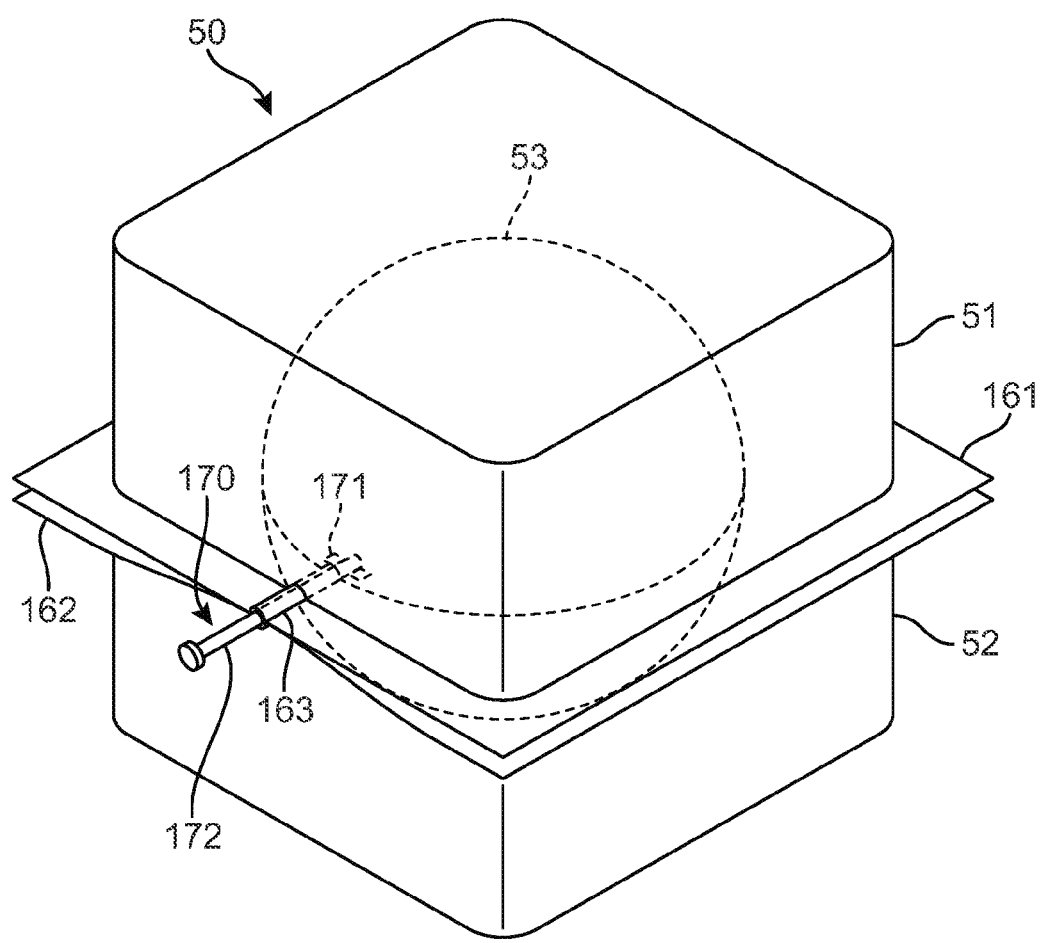

Bladder 141 may be formed using any one of the manufacturing processes set forth above in relation to the forming of bladder 41 of golf ball 10. As one example, FIGS. 10A-12 set forth an exemplary method of manufacturing using the thermoforming process described above. In particular, FIGS. 10A-10B depict an exemplary thermoforming process using the exemplary mold 50 depicted in FIGS. 3 and 4 and previously described. According to at least one embodiment, mold 50 may be utilized to form bladder 141 from a pair of polymer sheets, bladder panel 161 and bladder panel 162, similar to the process described above with respect to golf ball 10. In particular, bladder panel 161 and bladder panel 162 are positioned between upper mold portion 51 and lower mold portion 52, as depicted in FIG. 10A. In addition, according to at least one embodiment, a one-way valve 170 may be placed between bladder panel 161 and bladder panel 162 such that nipple 171 is positioned inside seam area 164 and nozzle 172 extends through a conduit 163.

Figure 12:
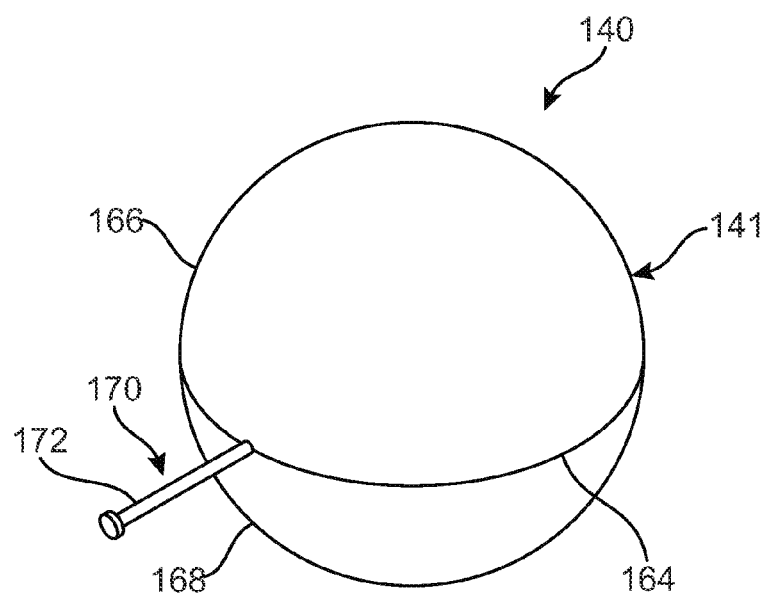
FIG. 12 is a perspective view of the bladder following the manufacturing process according to an additional embodiment set forth herein.

Thus, when formed into bladder 141 as depicted in FIG. 12, bladder panel 161 and bladder panel 162 form bladder top hemisphere 166 and bladder bottom hemisphere 168, respectively. Further, one-way valve 170 may be positioned between bladder panel 161 and bladder panel 162, and configured to protrude at seam 164.

During forming, once bladder panel 161 and bladder panel 162 are positioned between mold portion 51 and mold portion 52 as depicted in FIG. 10A, mold portion 51 and mold portion 52 translate toward each other such that first bladder panel 61 and second bladder panel 62 enter cavity 63 around one-way valve 170 and are shaped and bonded, as depicted in FIG. 10B. As mold 50 contacts and compresses portions of bladder panel 161 and bladder panel 162, a fluid, such as air, having a positive pressure in comparison with ambient air may be injected between bladder panel 161 and bladder panel 162 to induce bladder panel 161 and bladder panel 162 to respectively contact and conform to the contours of mold portion 51 and mold portion 52 as discussed above.

Figure 11:
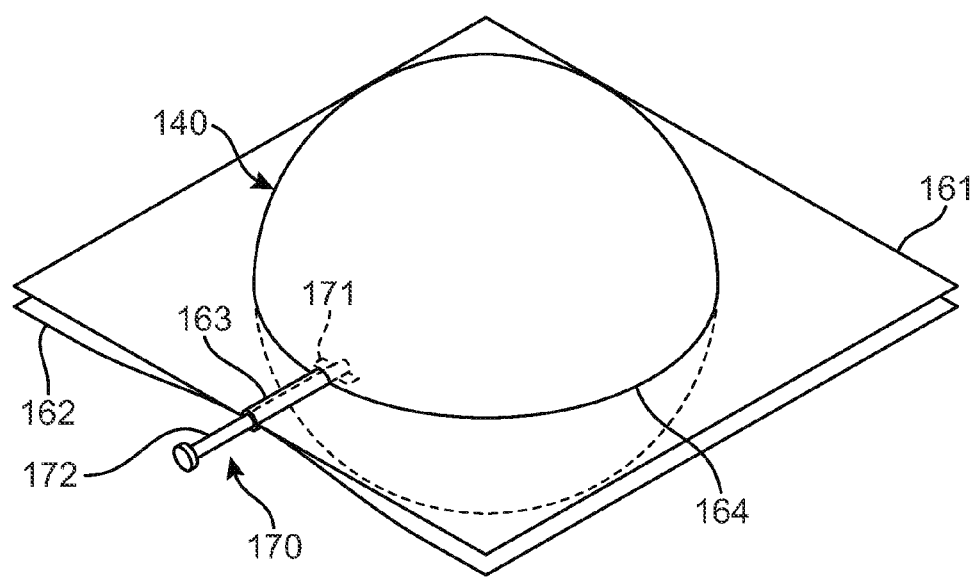
FIG. 11 is a perspective view of the bladder and residual portions of polymer sheets forming the bladder following the manufacturing process according to an additional embodiment set forth herein.

Once bladder 141 is formed within mold 50, mold portion 51 and mold portion 52 separate such that bladder 141, one-way valve 170 and peripheral portions of bladder panel 161 and bladder panel 162 may be removed from mold 50, as depicted in FIG. 11. Bladder 141 is then permitted to cool, and a pressurized fluid or core substance 148 may be injected into an interior of bladder 141 using one-way valve 170 or conduit 163. After bladder 141 is filled with core substance 148, conduit 163 may then be sealed at a position that corresponds with seam 164 and around one-way valve 170 to seal bladder 141. In addition, excess portions of bladder panel 161 and bladder panel 162 may be trimmed or otherwise removed from bladder 141, leaving bladder 141 with one-way valve 170 as depicted in FIG. 12. Once bladder 141 is formed to create core layer 140, intermediate layer 130 and cover layer 120 may be applied as above using known techniques.

It is further contemplated that a golf ball with a bladder core, such as discussed herein, may be further altered in various ways known to those skilled in the art and still fall within the spirit and scope of the invention. For example, a skilled artisan may modify the number of layers in the golf ball, alter the relative sizes of the layers, or the diameter of the core, alter the materials used on one or multiple layers, change the dimple pattern, or perform another alternation known in the art to enhance or alter performance characteristics of the ball.

Figure 13:
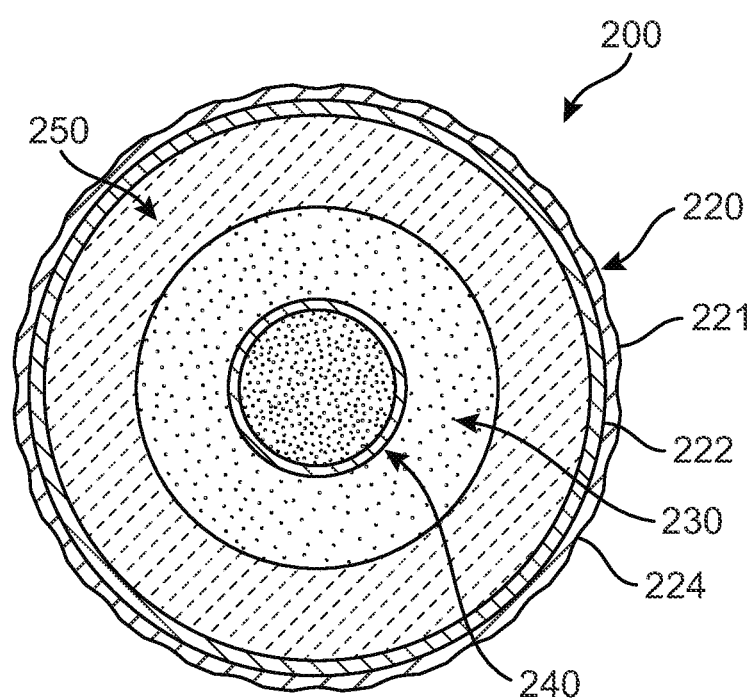
FIG. 13 is a cross-sectional view of the golf ball depicted in FIG. 1, as defined by section line 2 in FIG. 1, according to yet an embodiment set forth herein.

FIG. 13 depicts a cross-sectional view of one such additional embodiment, i.e., golf ball 200, having bladder core 240. As may be seen in FIG. 13, golf ball 200 exhibits a layered structure similar to the previously described embodiments, but with an additional layer, mantle layer 250. In particular, according to one embodiment, golf ball 200 is depicted as having (a) a cover layer 220 (with both an inner cover layer 222 and an outer cover layer 221) that forms an exterior portion of golf ball 200, (b) a mantle layer 250, where cover layer 220 substantially surrounds and encloses mantle layer 250, (c) an intermediate layer 230 or outer core layer 230, where mantle layer 250 substantially surrounds and encloses outer core layer 230, and (d) an internal bladder core 240 that forms an interior portion of ball 200, where outer core layer 230 substantially surrounds and encloses core 240. Golf ball 200 may be manufactured and formed in the same manner discussed above in relation to the previous embodiments, with the additional mantle layer 250 being molded or otherwise applied over intermediate layer 230 before cover layer 220 is applied. The addition of mantle layer 250 may allow the manufacturer to add additional performance enhancements to golf ball 200, such as increased distance and spin control off of the golf club head.

While various embodiments have been described herein, the description is intended to be exemplary, rather than limiting and it will be apparent to those of ordinary skill in the art that many more embodiments and implementations are possible that are within the scope of the present disclosure. Accordingly, the disclosure is not to be restricted except in light of the attached claims and their equivalents. Also, various modifications and changes may be made within the scope of the attached claims.

What is claimed is:

1. A golf ball comprising:
   a core:
   an intermediate layer substantially surrounding the core; and
   an outer layer substantially surrounding the intermediate layer, the outer layer including a plurality of dimples;
   wherein the core comprises a bladder, the bladder having walls which define an internal space, wherein the walls of the bladder are formed from an ethylene-vinyl alcohol copolymer layer; and
   wherein the bladder is formed from multiple layers fused together and contains a fluid, wherein a center layer of the bladder is the ethylene-vinyl alcohol copolymer layer, and wherein layers adjacent to the center layer are formed of thermoplastic polyurethane.

2. The golf ball according to claim 1, wherein the bladder is formed from seven layers fused together.

3. The golf ball according to claim 1, further comprising a one-way valve configured to interface with the bladder.

4. The golf ball according to claim 1, further comprising a mantle layer substantially surrounding the intermediate layer.

5. The golf ball according to claim 1, wherein the fluid comprises a pressurized gas.

6. The golf ball according to claim 1, wherein the intermediate layer comprises a rubber composition.

7. A golf ball comprising:
   a core;
   an intermediate layer substantially surrounding the core; and
   an outer layer substantially surrounding the intermediate layer, the outer layer including a plurality of dimples;
   wherein the core comprises a bladder, the bladder being formed from a plurality of bladder panels joined together to form a sealed structure that encloses a fluid;
   wherein the bladder panels are formed from multiple polymer layers fused together, wherein a center layer of each bladder panel is formed of ethylene-vinyl alcohol copolymer, and wherein layers adjacent to the center layer are formed of thermoplastic polyurethane.

8. The golf ball according to claim 7, wherein the bladder panels are formed from seven layers fused together.

9. The golf ball according to claim 7, further comprising a one-way valve configured to interface with the bladder.

10. The golf ball according to claim 7, further comprising a mantle layer substantially surrounding the intermediate layer.

11. The golf ball according to claim 7, wherein the fluid comprises a pressurized gas.

12. The golf ball according to claim 7, wherein the intermediate layer comprises a rubber composition.

* * * * *